United States Patent
Hennigar et al.

(10) Patent No.: US 7,987,972 B2
(45) Date of Patent: Aug. 2, 2011

(54) WIRE PLATE CONVEYOR BELT

(75) Inventors: Charles Hennigar, East New Market, MD (US); Chetwyn Jones, Cambridge, MD (US)

(73) Assignee: Cambridge International, Inc., Cambridge, MD (US)

( * ) Notice: Subject to any disclaimer, the term of this patent is extended or adjusted under 35 U.S.C. 154(b) by 0 days.

(21) Appl. No.: 12/608,490

(22) Filed: Oct. 29, 2009

(65) Prior Publication Data

US 2010/0108475 A1    May 6, 2010

Related U.S. Application Data

(60) Provisional application No. 61/110,186, filed on Oct. 31, 2008.

(51) Int. Cl.
*B65G 15/54* (2006.01)
(52) U.S. Cl. ........................................ 198/848
(58) Field of Classification Search .................. 198/848, 198/849; 99/365
See application file for complete search history.

(56) References Cited

U.S. PATENT DOCUMENTS

| | | | | |
|---|---|---|---|---|
| 861,484 | A * | 7/1907 | Stewart | 198/848 |
| 2,767,824 | A * | 10/1956 | King | 198/848 |
| 3,096,875 | A * | 7/1963 | Olson | 198/848 |
| 3,854,575 | A * | 12/1974 | Fraioli, Sr. | 198/831 |
| 5,358,095 | A * | 10/1994 | Curl | 198/848 |
| 6,142,294 | A * | 11/2000 | Kobayashi et al. | 198/848 |

FOREIGN PATENT DOCUMENTS

| | | |
|---|---|---|
| EP | 1 067 065 A2 | 1/2001 |
| JP | 6-141985 A | 5/1994 |
| JP | 2003-118820 A | 4/2003 |

OTHER PUBLICATIONS

International Search Report issued May 20, 2010 by the Korean Intellectual Property Office in International Application No. PCT/US2009/005858.

* cited by examiner

*Primary Examiner* — James R Bidwell
(74) *Attorney, Agent, or Firm* — Buchanan Ingersoll & Rooney PC

(57) ABSTRACT

A conveyor belt includes a plurality of spaced rods transversely disposed with respect to a direction of travel and a plurality of plate elements overlying at least some of the rods so as to provide a support surface which imparts a predetermined marking or lack of marking to the product being conveyed.

13 Claims, 3 Drawing Sheets

WIRE PLATE CONVEYOR BELT

CROSS-REFERENCE TO RELATED APPLICATION

This application claims priority under 35 U.S.C. §119(e) to Provisional Application Ser. No. 61/110,186, filed Oct. 31, 2008.

FIELD OF THE INVENTION

The present invention is directed to a conveyor belt, more particularly to a wire conveyor belt, and still more particularly, to a wire conveyor belt having a plurality of plates thereover that are designed to provide a predetermined marking or lack of marking to a product being conveyed thereon.

BACKGROUND OF THE INVENTION

Wire conveyor belts have been in the market for many years. Wire conveyor belts are ideal for material handling, cooking, icing, slicing breading, cooling, filling, inspecting, and packing of products like breads, rolls, buns, donuts, confections, cakes, pies, pastries, light loads of meat, seafood, poultry, and processed products. They are also excellent for light-duty applications in metalworking and other industries. The simple, open design of wire conveyor belts provides efficient operation with minimum maintenance and easy cleanup to meet sanitation requirements. With reference to FIGS. 1 and 2, wire conveyor belt 10 comprises a plurality of metal rods 16 interconnected by a plurality of knuckles 18 formed at the rod ends. In conveyor belt 10, it is the rods 16 which support the product to be conveyed and hold the components of the belt together by way of the knuckle edge configuration.

It has been found in some instances that the rods of a wire conveyor belt can leave a mark on the product that runs on top of the belt. The markings may become even more prominent if the product is heated while it is on the belt or put under pressure, or if the product being conveyed is naturally soft or pliable. Since product appearance is an important part of any mass produced food item, the marking can be a barrier to the use of a conveyor belt to carry a product that has traditionally not been in contact with a belt and has a smooth surface. On the other hand, since product markings can become part of a product's recognition and even become desirable, controlling the marking on a product being conveyed could be beneficial and conducive to the use of a conveyor belt in most any environment. Still further, the surface of the product could be uneven and forced smooth by the use of a conveyor belt or a pair of opposing conveyor belts.

Accordingly, there exists a need in the marketplace for a wire conveyor belt having a product support surface that produces a predetermined marking, or lack of marking, on the product being conveyed based upon user preference.

SUMMARY OF THE INVENTION

These and other objects are met by a wire conveyor belt including a plurality of spaced rods and a plurality of plate elements disposed overlying at least some of the rods. The plate elements can be generally smooth such that when a product is being conveyed on the support surface no marking occurs from the plate elements or the underlying rods. Alternatively, the plate elements may include a predetermined marking or cut-out section, such as a logo, artistic design, pattern, or other graphic or text message on the upper surface thereof such that when a product is being conveyed on the support surface the marking on the plate element is imparted into the product while it is being conveyed.

BRIEF DESCRIPTION OF THE DRAWING FIGURES

These and other objects, features, and advantages of the present invention will become more readily apparent to those skilled in the art upon reading the following detailed description, in conjunction with the appended drawings in which.

DETAILED DESCRIPTION OF THE PREFERRED EMBODIMENTS

Figure 1:
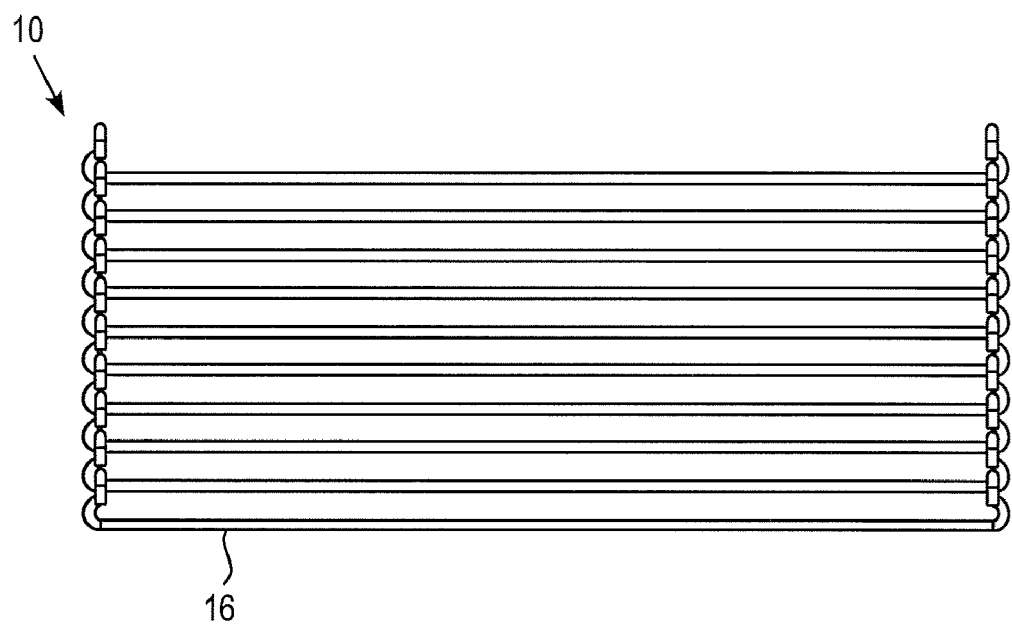
FIG. 1 is a top plan view of a segment of a conventional wire conveyor belt.
Figure 2:
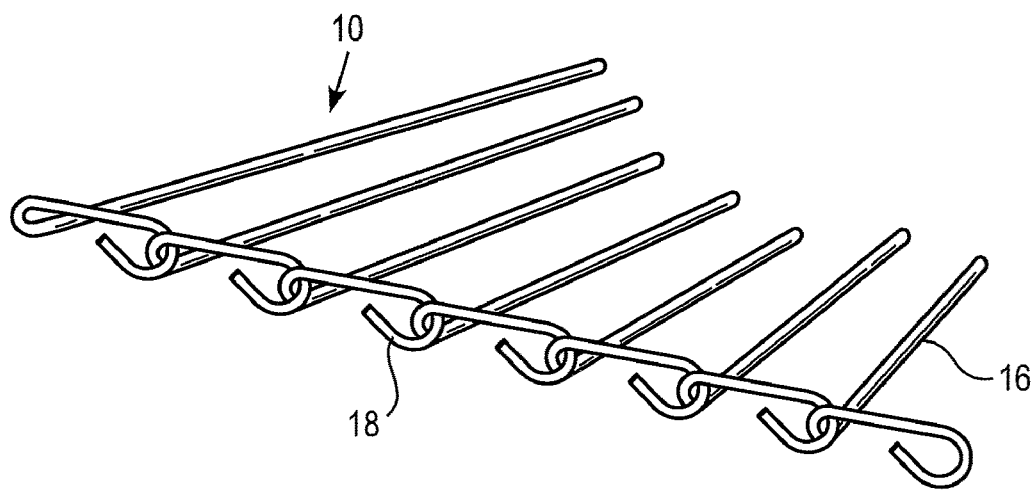
FIG. 2 is a side elevational view of the wire conveyor belt shown in FIG. 1.
Figure 3:
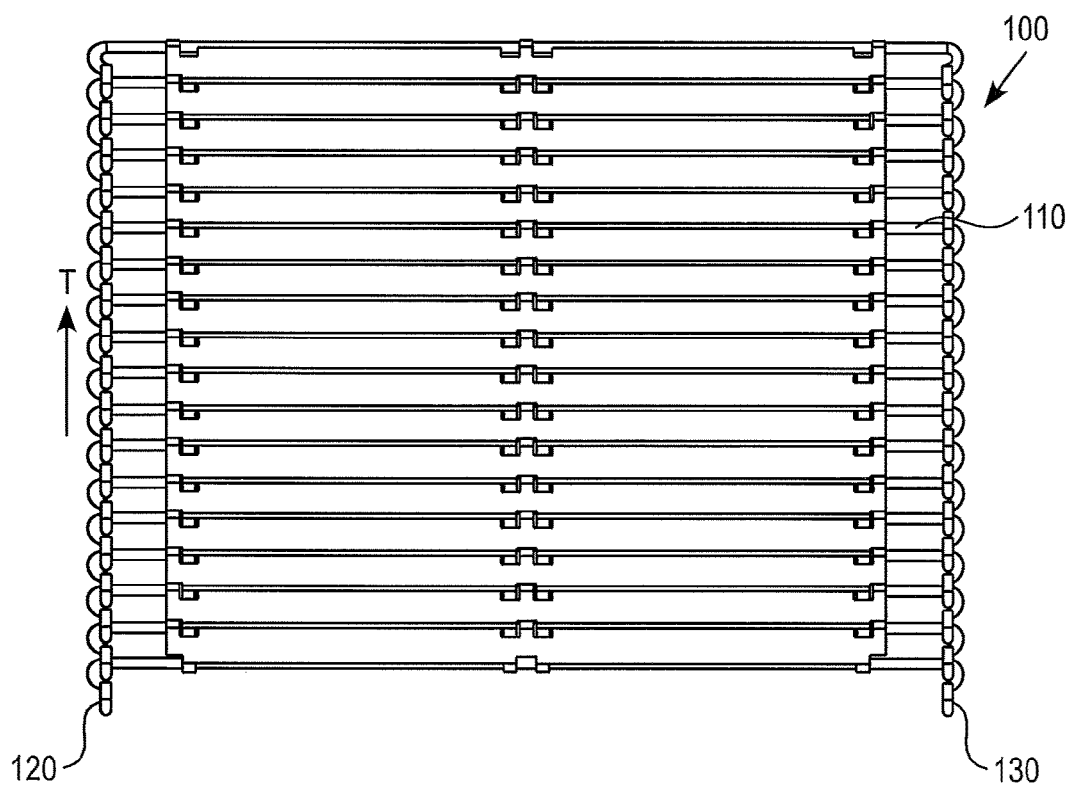
FIG. 3 is a top plan view of a wire conveyor belt according to a preferred embodiment of the present invention.
Figure 4:
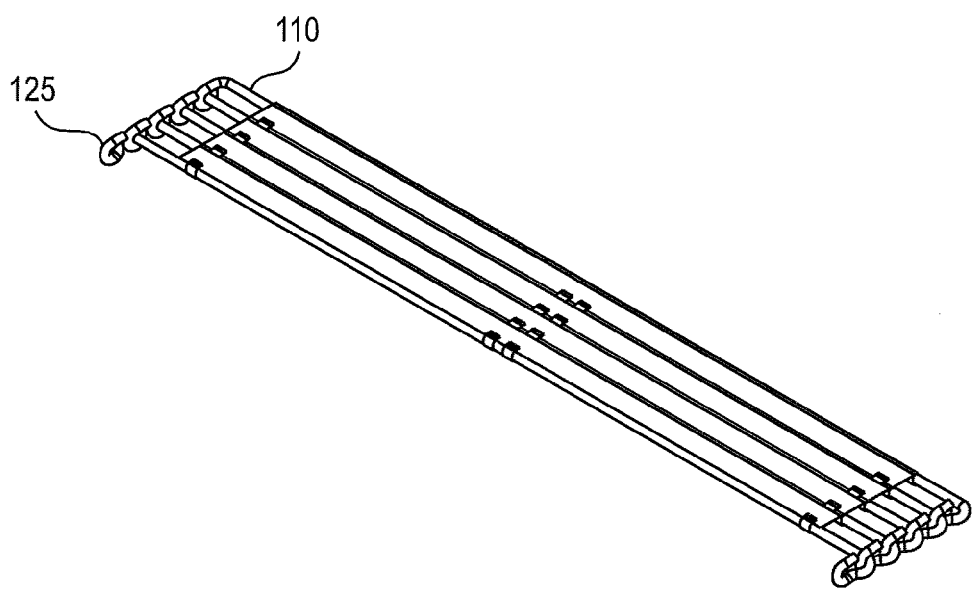
FIG. 4 is a perspective view thereof.

A conveyor belt in accordance with the present invention is shown generally in FIG. 3 by reference numeral 100. Conveyor belt 100 preferably comprises a wire conveyor belt including a plurality of spaced rods 110 disposed in succession and transversely with respect to a direction of travel T as represented by arrow T of belt 100, each rod 110 having two ends 120 and 130. The rods 110 are preferably formed from a metal wire, such as stainless steel, AISI T-304, or any similar metal wire. As shown in FIG. 4, the ends 120, 130 of each rod are bent rearwardly a predetermined distance and the terminal ends are curled so as to form a knuckle 125 and interlock with the adjacent rod 110.

Figure 5:
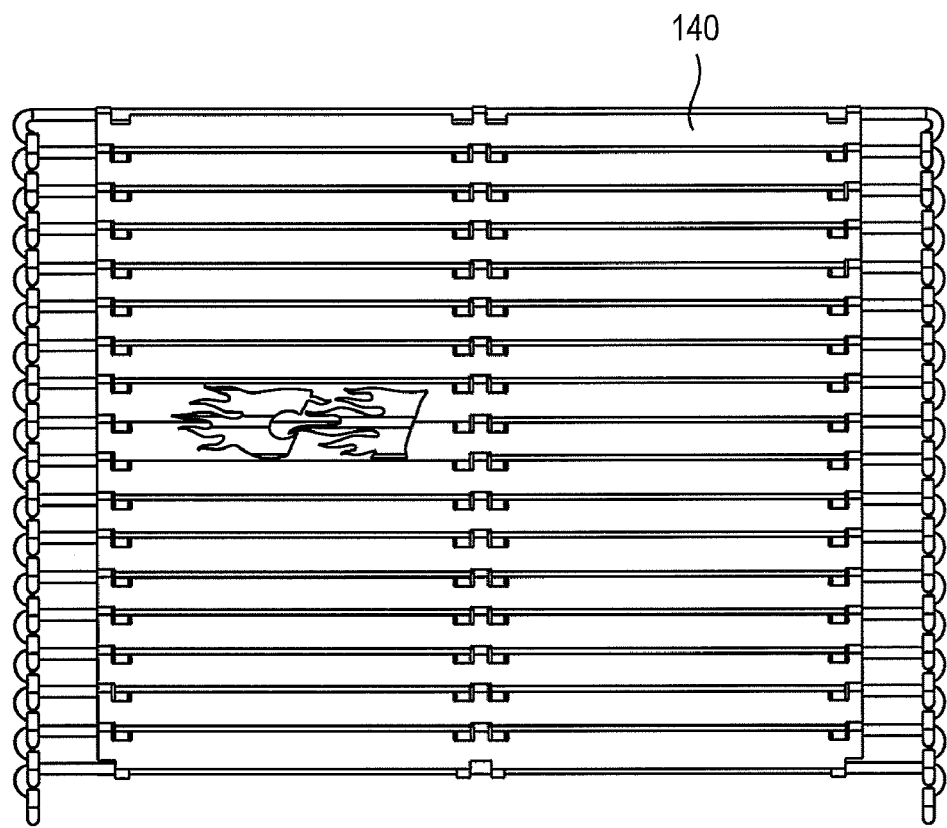
FIG. 5 is top plan view thereof with a portion of the overlying plate elements being broken away for clarity.
Figure 6:
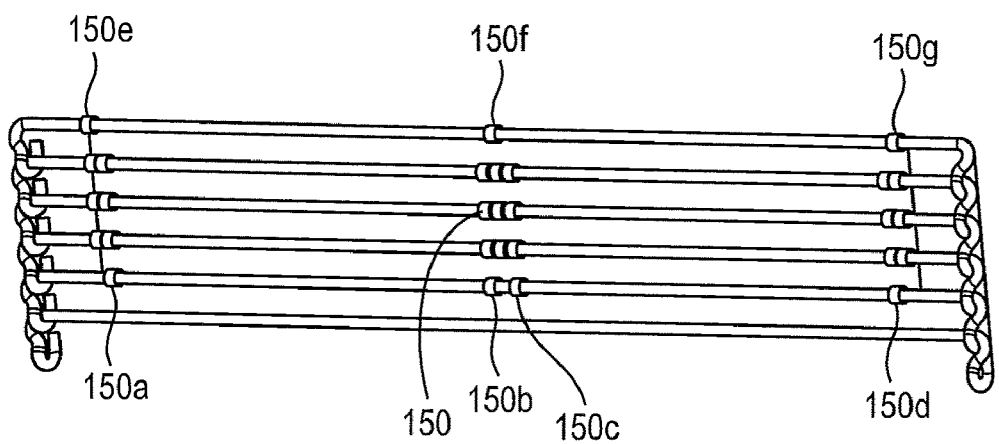
FIG. 6 is a rear elevational view thereof.

Referring to FIGS. 5 and 6, belt 100 preferably includes a plurality of plate elements 140 disposed overlying at least some of the rods 110. The plate elements 140 are connected at a rear side thereof to the rods 110 by a plurality of connector bands 150, as best shown in FIG. 6. The plate elements are preferably formed from a metal material, such as stainless steel, or any other material usable in the end use environment. The plate elements could also be formed from a plastic material, such as Acetal. The connector bands 150 are preferably formed of the same material as the plate elements. During belt fabrication, a plurality of rods 110 are interconnected at the ends 120, 130 to from an underlying wire belt and plate elements 140 are secured to the upper surface of the belt so as to define the product support surface 150. In a preferred embodiment, each plate element 140 includes four connector bands 150a, 150b, 150c, 150d on a trailing edge and three connector bands 150e, 150f, 150g on a leading edge. The plates 140 can be modified to allow selected sections of product to receive airflow, thereby aiding in heating, cooling or forming of product in an industrial setting.

In accordance with a first preferred embodiment of the present invention, the plate elements 140 are generally smooth. In this instance, when a product is being conveyed on support surface 150, no marking occurs from the plate elements 140 or the underlying rods 110.

In a further preferred embodiment, plate elements 140 may include a predetermined marking, such as a logo, artistic design, pattern, or other graphic or text message on the upper surface thereof. The marking will preferably be formed by a pattern in the plate element. Thus, when a product is being conveyed on support surface 150, the marking on the plate element 140 is embossed into the product while it is being conveyed. Alternatively, if the plate element 140 includes a cut-out section that allows uneven heating, marking can occur by scorching of a pattern onto the product during a toasting/cooking application.

While the present invention has been described with respect to a particular embodiment of the present invention, this is by way of illustration for purposes of disclosure rather than to confine the invention to any specific arrangement as there are various alterations, changes, deviations, eliminations, substitutions, omissions and departures which may be made in the particular embodiment shown and described without departing from the scope of the claims.

We claim:

1. A conveyor belt comprising:
   a plurality of spaced rods, each of said plurality of rods including a first end and a second end, said plurality of rods being disposed transversely with respect to a direction of travel of the conveyor belt; and
   a plurality of plate elements overlying at least some of said spaced rods, whereby a front side of said plurality of plate elements define a product support surface;
   wherein said plurality of plate elements are connected to said plurality of spaced rods at a leading edge of said plate elements and at a trailing edge of said plate elements relative to the direction of travel of the conveyor belt.

2. The conveyor belt according to claim 1, wherein said first end and said second end of each said rod is bent rearwardly, and a terminal end thereof is curled so as to interlock said rod with an adjacent one of said rods.

3. The conveyor belt according to claim 1, wherein said plurality of plate elements are generally smooth such that the product support surface defines a generally smooth surface.

4. The conveyor belt according to claim 1, wherein at least one of said plurality of plate elements includes a predetermined marking.

5. The conveyor belt according to claim 1, wherein at least one of said plurality of plate elements includes a cut-out portion defining a predetermined pattern.

6. The conveyor belt according to claim 1, wherein at least one of said plurality of plate elements includes an embossed graphic or text.

7. The conveyor belt according to claim 1, wherein said plate elements are plastic.

8. The conveyor belt according to claim 1, wherein said plate elements are stainless steel.

9. The conveyor belt according to claim 1, wherein said plate elements are connected to said spaced rods by a plurality of connector bands.

10. The conveyor belt according to claim 9, wherein said connector bands and said plate elements are formed from a same material.

11. The conveyor belt according to claim 9, wherein said connector bands and said plate elements are formed from a different material.

12. The conveyor belt according to claim 9, wherein said plate elements include four connector bands on a trailing edge of each said plate element connecting said plate element to one of said spaced rods.

13. The conveyor belt according to claim 12, wherein said plate elements include three connector bands on a leading edge of each said plate element connecting said plate element of another one of spaced rods.

\* \* \* \* \*